United States Patent Office 3,482,997
Patented Dec. 9, 1969

3,482,997
MAKING CHEESE USING A MODIFIED
BACTERIAL ENZYME COMPLEX FROM
THE GENUS BACILLUS
Edward D. Murray, London, and Maureen S. Kendall,
Thamesford, Ontario, Canada, assignors to John
Labatt Limited, London, Ontario, Canada
No Drawing. Filed Dec. 1, 1966, Ser. No. 598,191
Int. Cl. A23c *19/02;* C12d *13/10*
U.S. Cl. 99—116                            14 Claims

ABSTRACT OF THE DISCLOSURE

Cheese is made by coagulating milk with a peptidase enzyme complex from a bacterium of the genus Bacillus. The enzyme complex contains 1 part acid peptidase to 0.5 to 5.0 parts neutral peptidase and is free from alkaline peptidase.

---

This invention relates to a new and useful bacterial enzyme complex. In particular, it relates to a milk-curdling enzyme complex which has been found to be particularly applicable to the preparation of cheese having excellent texture, yield and flavour-stability properties.

The animal enzyme preparation generally extracted from the fourth stomach of suckling calves is colloquially called "Rennet." Hereafter the term rennet is used in its colloquial sense. This preparation has long been known for its ability to coagulate milk and its subsequent low proteolysis of the curd so formed. In these two properties rennet stood alone and its success in the manufacture of various types of cheeses and milk desserts is attributable mainly to these properties. However, because the raw material used for the production of this enzyme is the fourth stomach of suckling calves, the supply of the raw material is limited and costly.

It is known generally that, proteolytic enzymes, hereinafter referred to as peptidases, have the ability to coagulate milk. Thus, peptidases of animal origin, e.g. pepsin and trypsin as well as those of vegetable origin, e.g. papain and ficin, all are capable of coagulating milk. Because of the short supply of rennet, pepsin has been used as an extender for rennet. Although pepsin is generally regarded as being very similar to rennet in activity and specificity, it has been found that cheeses made from coagulating preparations containing substantial amounts of pepsin tend to become bitter on storage. This suggests a type of proteolysis different than rennet proteolysis. Trypsin has the disadvantage of being too highly proteolytic so that, although it readily coagulates milk, subsequent extensive proteolysis tends to break down the curd formed.

Also, peptidases produced from bacteria e.g. *Bacillus subtilis* and *Pseudomonas fluorescens* have milk coagulating activity. Bacterial peptidases are described in British Patent No. 565,788 of Nov. 28, 1944. However, since these peptidases have high proteolytic activity and have relatively low milk coagulating activity, they could not be put to practical use as milk coagulating enzymes.

Numerous other attempts have been made to find a substituted for rennet including the enzyme obtained from the fungus *Endothia parasitica* as described by Sardinas, United States Patent No. 3,275,453 issued Sept. 27, 1966 and enzyme obtained from the fungus *Mucor pusillus* Lindt as described by Arima et al., United States Patents 3,151,039 and 3,212,905. However, the enzyme obtained from *Endothia parasitica* has the disadvantage that *Endothia parasitica* is a plant pathogen. The enzyme produced from *Mucor pusillus* Lindt appears to have the disadvantage of producing a cheese of corky texture that requires a long ripening period for normal flavour development.

According to this invention, it has now been discovered that a highly satisfactory substitute for rennet can be obtained from milk coagulating bacterial peptidases, e.g. that obtained from the genus Bacillus. Such peptidases may be treated to obtain a complex of an acid peptidase and a neutral peptidase that is substantially free from alkaline peptidase. The acid and neutral peptidases may be used in the ratio of 1 part acid peptidase to between about 0.5 to about 5.0 parts neutral peptidase and particularly good results are obtained when the ratio is 1 part acid peptidase to between about 2 to about 3 parts neutral peptidase.

A particularly suitable enzyme complex according to the invention is one obtained from the bacteria *Bacillus subtilis* which contains about 2–3 parts neutral peptidase per part acid peptidase. When this enzyme complex was used to coagulate milk, it was found that the resulting coagulum was superior to all others tested while the cheese obtained was of excellent quality and yield and also showed no tendency to deteriorate or become bitter with age. It was also found to be advantageous to add some inorganic ions to the enzyme complex. Among such inorganic ion additives there may be mentioned magnesium, manganese, potassium, calcium, zinc and sodium.

The enzyme complex according to the invention can be obtained from any milk-coagulating bacterial enzyme complex containing at least an acid and a neutral peptidase. Such an enzyme complex may also contain an innocuous alkaline peptidase otherwise the same must be substantially removed, inhibited or inactivated so that it is negligibly active during the production of the cheese.

Various methods are available for removing, inhibiting or inactivating the alkaline peptidase. It may, for example, be inhibited by the addition of a suitable inhibitor such as that extracted from potatoes. It is possible to inactivate the alkaline peptidase by thermal denaturation since the acid and neutral peptidases possess a higher degree of thermal stability than the alkaline peptidase. Still further it is possible to remove the alkaline peptidase by recognized techniques such as precipitation or fractionation. A particularly suitable technique is the separation of the alkaline peptidase by ion-exchange chromatography. This technique is simplified by the fact that the alkaline peptidase carries a net negative charge while the acid and neutral peptidases each possess net positive charges.

The medium used for cultivating the bacteria in accordance with the invention can be any suitable natural or artifical medium provided that it contains at least a carbon source, a nitrogen source and inorganic salts. As the carbon source, there can be used any monosaccharide, disaccharide or polysaccharide which is assimilable by the bacteria, such as fructose, sucrose, lactose, and starch. A wide variety of assimilable nitrogen sources can also be used, such as inorganic ammonium salts, amino acids and a variety of protein substances. As examples of inorganic salts there may be mentioned magnesium salts, calcium salts, manganese salts and various phosphates. A particularly suitable medium according to the invention is one which is low in fermentable nitrogen and carbohydrate, for example a medium containing not more than about 4% (w./v.) whole wheat bran during fermentation.

The ratio of acid peptidase to neutral peptidase can be adjusted by a variety of methods both before and during the formation of the enzyme complex in the culture medium and also after the complex has been formed. Such methods for altering the ratio of acid peptidase to neutral peptidase may include variation of parameters, i.e. air or agitation, in the fermentor, precipitation or fractionation from the culture filtrate, as well as other well known techniques.

It was found that when *Bacillus subtilis* was grown in a medium containing wheat bran and calcium chloride, both acid peptidase and neutral peptidase as well as alkaline peptidase were obtained in the culture filtrate, but that the amount of acid peptidase relative to the amount of neutral peptidase was somewhat less than is required for high quality curd formation. Extensive nutritional studies showed that when the amino acid L-leucine was added to the culture medium before growth, the proportion of acid peptidase in the culture filtrate was increased while the proportions of neutral peptidase and alkaline peptidase were both decreased. It was also found that the L-leucine could be added to the culture medium in the pure form or in the racemic form, or in the form of a suitable nutrient containing L-leucine.

A preferred method for adjusting the ratio of acid peptidase to neutral peptidase in the broth is offered by ion-exchange chromatography due to the different rates of elution of the two enzymes from the adsorbant. A further method of adjusting the ratio of acid peptidase to neutral peptidase may be carried out on the enzyme complex after reduction of any alkaline peptidase by differential thermal denaturation due to the greater thermal stability of the acid peptidase compared to the neutral peptidase. Other well known techniques of enzyme manipulation may also be used.

In a study of the effects on milk of various peptidases, it was observed that some peptidases possessing maximum activity on casein at about pH 7.0, but acting over a range of about pH $7.0 \pm 1.5$, readily coagulated skimmed milk. Said peptidases are hereinafter called neutral peptidases. Milk used in these tests and all other coagulation tests was acidified to pH 6.5 with lactic acid and maintained at 36° C. The coagulum produced by neutral peptidase was compared to that produced by rennet and was found to be softer, more ashy (i.e. many curd fines were present) and of a less rubbery texture. Certain other peptidases, hereinafter called acid peptidases, possessing maximal activity peaks on hemoglobin in the mid-acid range (pH $4.0 \pm 2.0$) failed to coagulate milk. However it was discovered that if such an acid peptidase were combined with a neutral peptidase and this combination were added to milk, the resulting coagulum was of a better overall quality than that obtained when the neutral peptidase was used alone.

A third group of peptidases, hereinafter called alkaline peptidases (with maximal activity on casein occurring in the range of pH $8.5 \pm 1.0$) was also used in milk coagulation studies. It was observed that when such an enzyme was used alone, or in combination with a neutral peptidase, or in combination with a neutral and an acid peptidase preparation, a coagulum of extremely poor overall quality, when compared to a rennet coagulum, was produced. It therefore appeared that an enzyme system containing acid peptidase plus neutral peptidase with little or no alkaline peptidase might substitute successfully for rennet.

The overall texture (smoothness, hardness, rubber character) of a coagulum of milk is readily apparent to one skilled in the art of cheese making. However, such an evaluation provides little or no quantitative data for comparative work. In order to obtain comparative data the following curd assay procedure has been devised: A fixed quantity of milk, preconditioned to the previously noted state, was coagulated with an enzymic preparation. The coagulum was cut and syneresis was allowed to progress for 30 minutes. The entire mass of whey and curd was then centrifuged at 1225 relative centrifugal force (gravities) for 10 minutes. After centrifuging, the precipitated curd button was subjected to a penetration test. For this test a Penetrometer (Precision Scientific Co. —ASTM specification D 217) with a ¼ size penetration cone (ASTM specification D 1403) was used. A standard penetration time of 5 seconds was followed for all tests. Rennet curd and rennet-like curds show minimal penetration, as expressed in millimeters of actual penetration.

Typical penetration values for curd produced by various (combinations of commercially available) coagulating preparations are listed in Table 1:

TABLE 1

| Enzymic preparation: | Penetration, mm. |
|---|---|
| Rennet | 3.5 |
| Pepsin | 3.5 |
| Trypsin | 7.0 |
| Commercial neutral peptidase | 5.4 |
| Commercial neutral + commercial acid peptidases | 4.5 |
| Commercial neutral + commercial acid + commercial alkaline peptidases | 5.8 |
| Commercial alkaline peptidase | 6.2 |

Next, *Bacillus subtilis* was grown in a wheat bran-calcium chloride medium and the clarified culture filtrate was assayed for peptidase components. The assay procedure was a modification of the Anson Method as outlined by Husian & McDonald—Can. J. Microbiol. 4 237–242 (1958) using as substrates Vitamin Free Casein and Standardized Haemoglobin (Nutritional Biochemicals Corp.). It was further modified by the use of succinate buffers in the acid (haemoglobin) range and Tris-maleate buffers in the neutral and alkaline (casein) range. The assay of neutral peptidase in the presence of alkaline peptidase was accomplished by inhibiting the latter with Potatoe Inhibitor, extracted in accordance with the method of Watanabe-Nippon Nogei-Kagaku Kaishi, 32 260–262 (1958). The neutral peptidase was inhibited by chelation with ethylene-diamine tetraacetic acid and hence the chelator insensitive alkaline peptidase was measured.

These assay procedures demonstrated that the culture filtrate contained two peptidases normally associated with the growth of *Bacillus subtilis*, i.e. an alkaline peptidase and a neutral peptidase. In addition to these usual peptidases it was discovered that an acid peptidase also was present having a maximum activity peak in the mid-acid range. The acid peptidase was shown to be dependent upon divalent cations (especially calcium and zinc) for activity and stability. It was readily inhibited by chelating agents. This enzyme could be demonstrated only when low sequestering buffers were used in the peptidase assay system. The presence of three peptidases in the culture filtrate was confirmed by both cellulose acetate and disc electrophoresis.

On the basis of the previous finding that the overall quality of a milk coagulum produced from commercial peptidases improved when only acid peptidase and neutral peptidase were present, steps were taken to reduce the quantity of alkaline peptidase in the filtrate. The alkaline peptidase was conveniently removed by passing the filtrate through cationic adsorbents in an ion exchange column where the negatively charged alkaline peptidase was separated from the positively charged acid and neutral peptidases.

The enzyme complex thus obtained consisting of acid peptidase and neutral peptidase plus inorganic ions was used for coagulation studies. Curd so produced was found to have a penetration value of 3.5 mm., the same as that obtained from rennet as shown in Table I. Cheeses were made from the enzyme complex and these cheeses were found to compare favourably with cheddar cheese produced from rennet, both initially and after normal ripening periods.

The following examples illustrate the invention, it being understood that they are intended only in an illustrative sense and the invention should not be limited thereby, it being possible to make various changes in the bacteria employed, the composition of the medium, etc., without departing from the spirit or scope of the invention.

Example 1.—Production of culture filtrate

An inoculum of *Bacillus subtilis* was prepared by transferring organisms from an agar slant to a sterile seed medium of trypticase soy broth (3.0% w./v.) fortified with calcium chloride (0.01% w./v.) adjusted to pH 6.2 with 1.0 N HCl. The seed medium was prepared by dispensing 100 ml. of medium into 300 ml. Erlenmeyer flasks. The inoculated seed preparation was shaken on a rotary shaker (2 inch throw at 125 r.p.m.) for 12 hours at 36° C. After this incubation period the seed was used on a 2% (v./v.) basis to inoculate a production medium.

The production medium was prepared by using water extractable nutrients from wheat bran. To accomplish this a slurry of wheat bran (3.0% w./v.) and water was boiled under pressure at 120° C. for 45 minutes. The mixture was then cooled and allowed to settle and the clear supernatant was drawn off and fortified with calcium chloride (0.01% w./v.). The medium was adjusted with 1.0 N HCl so that after sterilization the final pH was 6.2±0.1.

The inoculated production medium was maintained at 36° C. and stirred at 300 r.p.m. in a baffled fermentor of 5.0 liters working volume. Sterile air was added at the rate of 2 liters per minute and normal liquid antifoaming agents were used to suppress foam. The system was allowed to grow until a maximum level of enzymic activity was reached (judged by milk coagulation tests), this growth period being generally 12±1 hours. The culture broth was then clarified by centrifugation and/or filtration and was found to contain 2000 units acid peptidase, 4740 units neutral peptidase and 1308 units alkaline peptidase per milliliter of broth.

Example 2.—Production of culture filtrate

An inoculum of *Bacillus subtilis* was prepared by transferring organisms from an agar slant to a sterile seed medium of trypticase soy broth (3.0% w./v.) fortified with calcium chloride (0.01% w./v.) and L-leucine (0.01% w./v.), all adjusted to pH 6.2 with 1.0 N HCl. The seed medium was perpared by dispensing 100 ml. of medium into 300 ml. Erlenmeyer flasks. The inoculated seed preparation was shaken on a rotary shaker (2 inch throw at 125 r.p.m.) for 12 hours at 36° C. and after this incubation period the seed was used on a 2% v./v. basis to inoculate a production medium.

The production medium was prepared by using water extractable nutrients from wheat bran. To accomplish this a slurry of wheat bran (3.0% w./v.) and water was boiled under pressure at 120° C. for 45 minutes. The mixture was then cooled and allowed to settle and the clear supernatant was drawn off and fortified with calcium chloride (0.01% w./v.) and L-leucine (0.01% w./v.). The medium was adjusted with 1.0 N HCl so that after sterilization the final pH was 6.2±0.1.

The inoculated production medium was maintained at 36° C. and stirred at 300 r.p.m. in a baffled fermentor of 5.0 liters working volume. Sterile air was added at the rate of 2 liters per minute and normal liquid antifoaming agents were used to suppress foam. The system was allowed to grow until a maximum level of enzymic activity was reached (judged by milk coagulation tests), this growth period being generally 12±1 hours. The culture broth was then clarified by centrifugation and/or filtration and was found to contain 2,300 units acid peptidase, 4140 units neutral peptidase and 987 units alkaline peptidase per milliliter of broth.

Example 3.—Production of culture filtrate

The procedure as outlined in Example 2 was followed with the exception that a different seed medium was used. This replacement seed medium contained 2.0% (w./v.) of a preparation from casein available from Delmar Chemical Ltd., under the tradename Totamine, calcium chloride (0.01% w./v.) and potassium dihydrogen phosphate (0.10% w./v.). After sterilization the final pH was 6.10±0.1. All other steps in the process remained unchanged and the clarified culture broth was essentially the same as produced in Example 2.

Example 4.—Production of culture filtrate

A procedure as outlined in Example 2 or Example 3 was followed with the exception that the production medium was modified so that whole wheat bran at a level of 1.25% (w./v.) was added directly to the fermentor. This eliminated the boiling step necessary for extraction of water soluble nutrients. All other production medium constituents remained the same. The clarified culture broth was essentially the same as produced in Example 2.

Example 5.—Production of culture filtrate

A production as outlined in Examples 2, 3 or 4 was followed with the exception that the production medium was modified so that the amino acid L-leucine was omitted and totamine (0.25% w./v.) was used in its place. All other production medium constituents remained the same. The clarified culture broth was essentially the same as produced in Example 2.

Example 6.—Production of culture filtrate

A procedure as outlined in Examples 2, 3 or 4 was followed with the exception that the production medium was modified so that the amino acid L-leucine was omitted and Zein (0.25% w./v.), a protein fraction from maize, was used in its place. All other production medium constituents remained the same. The clarified culture broth was essentially the same as produced in Example 2.

Example 7.—Production of culture filtrate

A procedure as outlined in Example 3 was followed with the exception that the production medium was modified so that the wheat bran was omitted and rice bran concentrate (0.50% v/v.) was used in its place. This latter product was obtained from Charles Bowman and Company, Holland, Mich. All other production medium constituents remained unchanged and the clarified culture broth was essentially the same as produced in Example 2.

Example 8.—Production of culture filtrate

A procedure as outlined in Example 3 was followed with the exception that the *Bacillus subtilis* strain which was previously used was replaced with *Bacillus subtilis* A.T.C.C. No. 465. All other production procedures remained unchanged and the clarified culture broth readily coagulated milk and was shown to possess alkaline peptidase, neutral peptidase and acid peptidase.

Example 9.—Production of culture filtrate

A procedure as outlined in Example 3 was followed with the exception that the *Bacillus subtilis* strain which was previously used was replaced with *Bacillus subtilis* A.T.C.C. No. 6051. All other production procedures remained unchanged and the clarified culture broth readily coagulated milk and was shown to possess alkaline peptidase, neutral peptidase and acid peptidase.

Example 10.—Production of culture filtrate

A procedure as outlined in Example 3 was followed with the exception that the *Bacillus subtilis* strain which was previously used was replaced with *Bacillus subtilis* A.T.C.C. No. 12432. All other production procedures remained unchanged and the clarified culture broth readily coagulated milk and was shown to possess alkaline peptidase, neutral peptidase and acid peptidase.

Example 11.—Production of finished product

Culture filtrate was adjusted to pH 4.9±0.2 with dilute hydrochloric acid and the specific conductance was corrected to 1800±100 micromhos by the addition of sodium chloride or deionized water. The adjusted filtrate was applied to an ion exchange adsorbent, preferably a column of cationic carboxymethyl cellulose ether equilibrated with $2 \times 10^{-4}$ molar zinc chloride and $2 \times 10^{-3}$ molar calcium chloride. The equilibrated column had a specfiic conductance of 1800±100 micromhos and was at pH 4.9±0.2. Zinc and calcium chlorides were added to enhance enzyme activities and stabilities.

Both acid peptidase and neutral peptidase were adsorbed onto the cellulose, while negatively charged material (including any residual alkaline peptidase) and uncharged material, passed through the column. Approximately two void volumes of adjusted filtrate were passed through the column, the filtrate contained sufficient cationic material to saturate the reactive sites on the cellulose. The column was then washed with acidified water (pH 4.9±0.2) at 1800±100 micromhos specific conductance. This cleansing step removed unadsorbed material from the column bed. An eluting solution of 0.07 molar sodium chloride at pH 5.8±0.2 was then passed through the column. The previously bound acid peptidase and neutral peptidase were recovered in a clear solution which was then concentrated at reduced temperature (37° C.) and pressure (29″ Hg). The final concentration was such that after addition of enzyme stabilizers and microbial inhibitors, as well as color and odor producing agents, three fluid ounces possessed sufficient activity to coagulate 1000 lbs. of milk.

Example 12.—Manufacture of cheese (pilot scale)

Whole pasteurized milk (16 Imp. gals.) was heated to 31±1° C. When this temperature was reached, a cheese starter culture (0.5 to 1.0% v./v.) was added and the mixture was stirred thoroughly. The starter organisms were allowed to grow until the acidity of the milk reached 0.17% as lactic acid. At this time 15 ml. of concentrated enzyme complex according to this invention were added. The mixture was stirred thoroughly and allowed to remain, covered and unagitated, in a jacketed vessel for 25–30 minutes.

The coagulated milk was then cut with a curd knife and the normal technique of cheddar cheese manufacture was followed. After pressing, the final cheese was placed in a ripening cabinet at a temperature of 12±2° C. with a relative humidity of 70–75%. The cheeses were allowed to ripen for periods of one to 18 months and evaluation of the cheeses at various time intervals showed them to be of normal cheddar flavour and texture.

Example 13.—Manufacture of cheese (semi-commercial scale)

A procedure as outlined in Example 12 was followed with the exception that 100 Imp. gals. of whole pasteurized milk were coagulated with three fluid ounces of concentrated enzyme complex according to the invention. During the cheddaring process it was observed that the curd possessed a highly desirable smooth silky texture and also a beneficial type of curd breakdown occurred. After pressing, the yield of cheese was calculated and it was found that no significant differences existed between the above cheeses and rennet controls. Cheeses were ripened for 90 days, those produced with the enzyme complex possessed normal cheddar flavour and texture when compared to control cheeses.

Example 14.—Comparison of proteolysis

To further demonstrate the suitability of the enzyme complex of the invention prepared as previously outlined, a comparative study was conducted on casein breakdown products produced by various coagulating preparations. Under identical conditions of time, temperature, pH etc., four enzymic preparations were used to coagulate individual milk samples. After centrifugation of the samples (as previously described) whey was collected from each sample. Enzymatically produced amino acids in each whey fraction were determined and the values obtained are itemized in Table 2 below:

TABLE 2

| Amino Acid in Whey (values are in p.p.m.) | Whey Fractions [1] | | | |
|---|---|---|---|---|
| | Rennet Extract | Enzyme Complex | Pepsin | Trypsin |
| Aspartic Acid | 0 | 2 | 0 | 68 |
| Threonine | 0 | 1 | 2 | 22 |
| Serine | 1 | 1 | 5 | 15 |
| Glutamic Acid | 19 | 27 | 51 | 74 |
| Proline | 2 | 4 | 6 | 17 |
| Glycine | 4 | 2 | 13 | 19 |
| Alanine | 1 | 1 | 5 | 22 |
| Valine | 2 | 0 | 2 | 78 |
| Isoleucine | 1 | 11 | 1 | 69 |
| Leucine | 1 | 1 | 2 | 302 |
| Tyrosine | 0 | 1 | 2 | 280 |
| Phenylalanine | 1 | 0 | 1 | 395 |
| Lysine | 3 | 10 | 8 | 259 |
| Histidine | 0 | 0 | 2 | 21 |
| Arginine | 1 | 0 | 6 | 234 |

[1] Enzyme activities selected were sufficient to coagulate 10 ml. of milk in about one minute.

Of the 15 amino acids determined as enzymatic breakdown products of casein, the enzyme complex of the invention produced fewer amino acids than pepsin. The total amino acid spectrum produced by the enzyme complex may be seen to closely resemble that produced by animal rennet.

What we claim as our invention is:

1. In a process for making cheese including the step of coagulating milk by the addition thereto of a peptidase enzyme complex produced from a bacterium of the genus Bacillus, the improvement wherein the enzyme complex contains an acid peptidase and a neutral peptidase in a ratio of 1 part acid peptidase to between about 0.5 to about 5.0 parts neutral peptidase and is substantially free from alkaline peptidase.

2. A process according to claim 1 wherein the bacterium is a strain of the species *Bacillus subtilis*.

3. A process according to claim 2 wherein the ratio of acid peptidase to neutral peptidase is in the range between about 1:2.0 to about 1:3.0.

4. A process according to claim 3 wherein the enzyme complex includes at least one monovalent metal ion and at least one divalent metal ion.

5. A process for producing an enzyme complex of acid and neutral peptidase having high milk coagulating activity and low protelolytic activity which comprises inoculating a medium containing sources of carbohydrate, nitrogenous material, essential trace nutrients and inorganic salts with a bacterium of the genus Bacillus, allowing growth to take place until a substantial amount of the enzyme complex is produced, thereafter extracting the enzymes formed and substantially removing, inhibiting, or inactivating any alkaline peptidase that is present to obtain acid and neutral peptidases in a ratio of 1 part acid peptidase to between about 0.5 to about 5.0 parts neutral peptidase.

6. A process according to claim 3 wherein the bacterium is a strain of the species *Bacillus subtilis*.

7. A process according to claim 6 wherein the alkaline peptidate is substantially removed by ion exchange chromatography.

8. A process according to claim 6 wherein the alkaline peptidase is substantially inhibited by the addition of an inhibitor.

9. A process according to claim 6 wherein the alkaline peptidase is substantially inactivated by thermal denaturation.

10. A process according to claim 6 wherein the medium is low in fermentable nitrogen and carbohydrate.

11. A process according to claim 10 wherein the medium is a wheat bran medium.

12. A process according to claim 11 wherein the medium is enriched with calcium ions.

13. A process according to claim 11 wherein the medium also is enriched with L-leucine.

14. A process according to claim 11 wherein the medium also is enriched with manganese, magnesium and phosphate.

References Cited

UNITED STATES PATENTS 3,212,905  10/1965  Arima et al. _____ 99—116
3,275,453  9/1966  Sardinas _____ 99—116

FOREIGN PATENTS 565,788  11/1944  Great Britain.

A. LOUIS MONACELL, Primary Examiner

D. M. NAFF, Assistant Examiner

U.S. Cl. X.R.

195—62, 66